July 12, 1932.  S. PENSRUM  1,867,278
CIRCUIT BREAKER FOR MOTOR VEHICLES
Filed Feb. 25, 1929
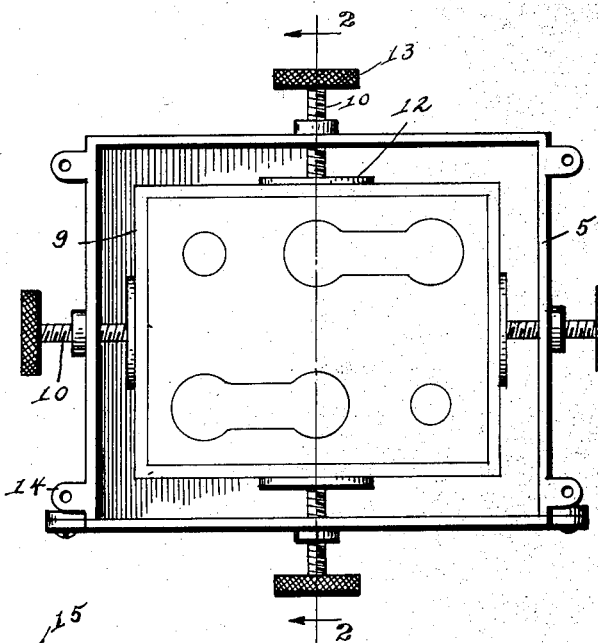
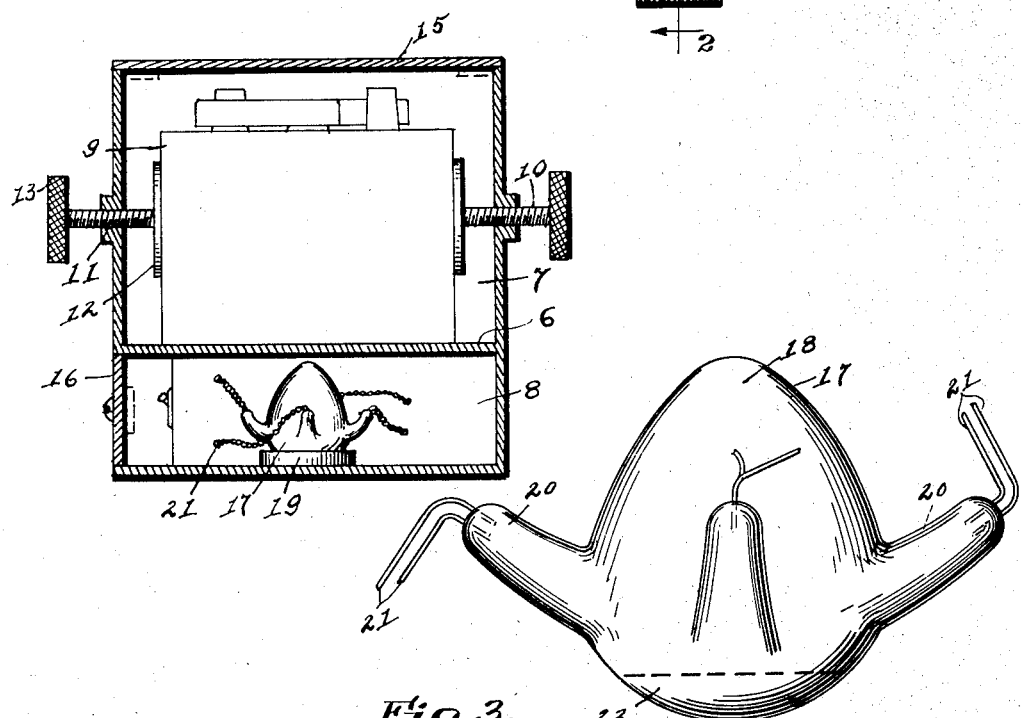
INVENTOR
Sylvanus Pensrum
BY
ATTORNEY Patented July 12, 1932

1,867,278

UNITED STATES PATENT OFFICE

SYLVANUS PENSRUM, OF WASHINGTON, MISSOURI

CIRCUIT BREAKER FOR MOTOR VEHICLES

Application filed February 25, 1929. Serial No. 342,563.

My invention relates to a device for the elimination of fires, particularly adapted for motor vehicles and the like.

The primary object of the invention is to provide a housing for the storage battery having means therein for cutting-out the main circuit leading from the storage battery to the electrical devices of the vehicle, when the vehicle is tilted at a dangerous angle or turns over.

A further object of the invention is to provide a novel circuit closer for actuating the mechanism for cutting out the main circuit when the vehicle reaches a dangerous angle.

Another object of the invention is to provide a device of the above-mentioned character, which is simple and durable in construction, reliable and efficient in use, and inexpensive to manufacture.

Other objects and advantages of the invention will be apparent during the course of the following description.

In the accompanying drawing, forming a part of this specification and in which like numerals are employed to designate like parts throughout the same, Fig. 1 is a top plan view of the box with the top removed, Fig. 2 is a vertical section taken on lines 2—2 of Fig. 1, and, Fig. 3 is a side elevation of my improved circuit closer.

In the drawing, wherein for the purpose of illustration, I have shown a preferred embodiment of my invention, the numeral 5 denotes a metal box of rectangular shape having a horizontal partition 6, dividing the box into upper and lower compartments 7 and 8. The upper compartment is adapted to receive the conventional type of storage battery 9 which is rigidly held in the compartment by a series of screw-clamps 10, threaded in openings 11 through the sides of the compartment, the inner ends of the clamps having disks 12 attached thereto and the outer ends being provided with knurled heads 13, by means of which the clamps may be readily adjusted. Extending from the upper edges of the box are a plurality of ears 14, by means of which a cover 15 is securely clamped on top of the box after the storage battery is installed.

The lower compartment 8 has one side open to permit access thereto, which is normally closed by a cover plate 16. Mounted within the lower compartment is the mechanism for cutting-out the main circuit leading from the battery to the various electrical devices of the motor vehicle and confining the current from the battery within the metal box. This mechanism is not shown merely consisting of a well known cut-out switch interposed in the main circuit, the cut-out switch being controlled by my improved circuit closer 17 which is in circuit with the cut-out switch, whereby the cut-out switch will be opened when the circuit closer 17 is actuated.

The circuit closer 17 consists of a glass bulb 18, its contour being substantially egg-shaped and is supported in an upright position by the base member 19. Extending radially and upwardly from the sides of the bulb, at spaced intervals are a plurality of hollow arms 20 and entering the outer extremity of each arm is a pair of wire terminals 21, each pair of wire terminals being in circuit with the cut-out switch. In the bottom of the bulb is a suitable quantity of mercury 22, which is adapted to flow into the arms 20 when the bulb is disposed at a predetermined angle, and establish a connection between the wire terminals 21, closing the circuit and setting into operation the cut-out switch.

In use, should a motor vehicle equipped with my device have a collision and be tilted at a dangerous angle or turn over, the mercury in the bulb 18 will flow into the arms 20, closing the circuit between the terminals 21 and setting in operation the cut-out switch whereby the main circuit leading from the battery to the electrical devices of the vehicle will be broken and the current from the battery will be confined within the metal box 5, eliminating all possibility of fire by reason of gasoline coming in contact with the electrical circuits.

It is to be understood that the form of my invention herewith shown and described is to be taken as a preferred example of the same and that certain changes in the shape, size and arrangement of the parts may be made without departing from the spirit of the invention or the scope of the subjoined claim.

Having thus described my invention, I claim:—

In a circuit closer, an elongated bulb adapted to be supported in an upright position, hollow arms formed integral with said bulb and extending radially and upwardly therefrom, at spaced intervals around said bulb, said arms being closed at their outer ends to form pockets, said closed ends of the arms being normally disposed above the plane of the open ends thereof, spaced terminals in the ends of said arms, having their contact surfaces exposed at the base of the pockets and a conducting liquid in the bottom of said bulb adapted to flow into said arms when the bulb is tilted at a predetermined angle.

In testimony whereof I affix my signature.

SYLVANUS PENSRUM.